(12) United States Patent
Iida et al.

(10) Patent No.: US 6,568,704 B2
(45) Date of Patent: May 27, 2003

(54) AIR BAG COVER WITH ORNAMENT

(75) Inventors: Hitoshi Iida, Nishikasugai-gun (JP); Tadashi Yamamoto, Nishikasugai-gun (JP); Osamu Hirose, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 10 days.

(21) Appl. No.: 09/873,308

(22) Filed: Jun. 5, 2001

(65) Prior Publication Data

US 2002/0030352 A1 Mar. 14, 2002

(30) Foreign Application Priority Data

Jun. 12, 2000 (JP) .......................... 2000-175817

(51) Int. Cl.$^7$ ............................ R60R 21/20; R60R 13/00
(52) U.S. Cl. ..................... 280/728.3; 280/731; 280/732; 428/31
(58) Field of Search ............................ 280/728.3, 731, 280/732; 428/31; 40/591, 593

(56) References Cited

U.S. PATENT DOCUMENTS

| | | | | |
|---|---|---|---|---|
| 5,294,147 A | * | 3/1994 | Edge | 280/728.3 |
| 5,678,851 A | * | 10/1997 | Saito et al. | 280/728.3 |
| 5,685,056 A | * | 11/1997 | Fischer | 280/728.3 |
| 5,851,022 A | * | 12/1998 | Yamamoto et al. | 280/728.3 |
| 5,913,534 A | * | 6/1999 | Klingauf | 280/728.3 |
| 6,003,895 A | * | 12/1999 | Niwa et al. | 280/728.3 |
| 6,105,999 A | * | 8/2000 | Johnson | 280/727 |
| 6,149,186 A | * | 11/2000 | Manfrin | 280/728.2 |
| 6,168,187 B1 | * | 1/2001 | Yamada et al. | 280/728.3 |
| 6,176,516 B1 | * | 1/2001 | Bobler et al. | 200/61.54 |
| 6,322,100 B1 | * | 11/2001 | Cuevas et al. | 280/728.2 |

FOREIGN PATENT DOCUMENTS

| | | | | |
|---|---|---|---|---|
| JP | 10-273004 | | 10/1998 | |
| JP | 2000025547 | * | 1/2000 | 280/728.3 |
| JP | 2000118344 | * | 4/2000 | 280/728.3 |
| JP | 2000135955 | * | 5/2000 | 280/728.3 |
| JP | 2000246556 | * | 9/2000 | 280/728.3 |
| JP | 2000255362 | * | 9/2000 | 280/728.3 |
| JP | 2000272458 | * | 10/2000 | 280/728.3 |
| JP | 2001151063 | * | 6/2001 | 280/728.3 |

\* cited by examiner

*Primary Examiner*—Paul N. Dickson
*Assistant Examiner*—Toan C To
(74) *Attorney, Agent, or Firm*—Posz & Bethards, PLC

(57) ABSTRACT

An air bag cover provided with an ornament and covering a folded air bag, the air bag cover being formed of synthetic resin and having door sections which are adapted to open when the air bag is expanded and inflated, the ornament including an ornamental part arranged on a front face of one of the door sections and a plurality of mounting legs extending downward from the ornamental part, the ornament being constructed so as to be mounted to the door section by passing the mounting legs through the mounting holes formed in the door section and bending them along the back face of the door section. The tip ends of bent portions of the mounting legs which have been bent along the back face of the door section are covered with the covering parts which are compatible with material forming the air bag cover so as to be melted and solidified.

8 Claims, 8 Drawing Sheets

AIR BAG COVER WITH ORNAMENT

BACKGROUND OF THE INVENTION

1. Field of the Invention

The present invention relates to an air bag cover for covering an air bag which has been folded to be contained, and more particularly to the air bag cover with ornament. Usually, air bag systems provided with the air bag covers are mounted on a steering wheel, in front of an assistant driver's seat, doors, seats, and so on of a vehicle.

2. Description of the Related Art

Conventionally, there have been some cases in which an ornament (emblem) is attached to a door section of the air bag cover which is adapted to open when the air bag is inflated (See Unexamined Japanese Patent Publication No. JP-A-10-273004).

This ornament has been formed of sheet metal material such as aluminum alloy, copper or the like by stamping with a press or so, and composed of an ornamental part, three leg portions arranged near a circumferential edge of the ornamental part, and through holes formed near tip ends of the respective leg portions. The ornament has been attached to the air bag cover by inserting the leg portions into three mounting holes formed in a covering part of the air bag cover, and by bending the leg portions along a back face of the covering part toward a center of the ornamental part. The through holes formed near the tip ends of the respective leg portions have been provided for the purpose of allowing welding bosses which have been integrally formed with the covering part and project toward the back face of the covering part to pass therethrough. After the welding bosses have been passed through the through holes and the leg portions have been bent, tip ends of the welding bosses have been heat caulked, thus enabling the leg portions to be connected to each other thereby fixing the ornament to the covering part.

However, the leg portions of the conventional ornament have been fixed by heat caulking the tip ends of the welding bosses, while the tip ends of the leg portions have been exposed. Because this ornament has been formed of the sheet metal material by stamping with the press, there has been a fear that the air bag may be damaged by corners at the tip ends of the leg portions when the expanding and inflating air bag interferes with the corners at the tip ends of the leg portions.

SUMMARY OF THE INVENTION

In view of the above, it is an object of the invention to provide an air bag cover with ornament which is free from the fear that the expanding and inflating air bag may be damaged by the ornament.

The present invention is an air bag cover with ornament and covering a folded air bag, the air bag cover being formed of synthetic resin and having door sections which are adapted to open when the air bag is expanded and inflated,
  the ornament including an ornamental part arranged on a front face of one of the door sections and a plurality of mounting legs extending downward from the ornamental part,
  the ornament being constructed so as to be mounted to the door section by passing the mounting legs through mounting holes formed in the door section and bending them along a back face of the door section,
  characterized in that tip ends of bent portions of the mounting legs which have been bent along the back face of the door section are covered with covering parts which are compatible with material forming the air bag cover so as to be melted and solidified.

Moreover, the bent portions of the mounting legs which have been bent along the back face of the door section are preferably bent at a bending angle of 90 degree or more with respect to penetrating portions of the mounting legs which pass through the mounting holes.

Further, it is desirable that on the back face of the door section near the tip ends of the bent portions of the mounting legs, there are formed insertion holes extending toward the front face of the door section, and
  the ornament has, at the tip ends of the bent portions of the mounting legs, inserting portions which can be inserted into the insertion holes, whereby the ornament is mounted to the door section with the inserting portions inserted in the insertion holes.

Still further, it is desirable that on the back face of the door section, there are formed projections so as to surround the bent portions of the mounting legs which have been bent along the back face of the door section, and
  the projections are provided with intended melting and solidifying parts capable of covering the tip ends of the bent portions when melted, thereby to form the covering parts.

According to the invention, the air bag cover is so constructed that the tip ends of the bent portions of the mounting legs which have been bent along the back face of the door section are covered with the covering parts which are compatible with the material forming the air bag cover so as to be melted and solidified. Therefore, there will be no fear that the air bag may be damaged by the ornament, because the corners of the tip ends of the mounting legs are not exposed on the back face of the door section, and accordingly, the expanding and inflating air bag will not interfere with the corners of the tip ends of the mounting legs of the ornament. Moreover, because the ornament is mounted to the door section of the air bag cover while the tip ends of the bent portions are covered with the covering parts, a spring up of the tip ends of the mounting legs (bent portions) away from the back face of the door section will be prevented by coverings of the covering parts. Thus, when the door section of the air bag cover opens along with the expansion and inflation of the air bag, the mounting legs of the ornament will not be detached from the mounting holes, and mounting strength of the ornament will be fully secured.

Therefore, the air bag cover provided with the ornament which is free from the fear that the expanding and inflating air bag may be damaged by the ornament and has sufficient mounting strength can be provided.

Moreover, by constructing the air bag cover in such a manner that the bent portions of the mounting legs which have been bent along the back face of the door section are bent at the bending angle of 90 degree or more with respect to the penetrating portions of the mounting legs which pass through the mounting holes, the bending angle of the bent portions with respect to the penetrating portions will be made larger, thus enabling the mounting strength of the ornament to be increased.

Further, by constructing the air bag cover in such a manner that on the back face of the door section near the tip ends of the bent portions of the mounting legs, there are formed the insertion holes extending toward the front face of the door section, and the ornament has, at the tip ends of the bent portions of the mounting legs, the inserting portions which can be inserted into the insertion holes, whereby the ornament is mounted to the door section with the inserting portions inserted in the insertion holes, the bending angle of the tip ends of the bent portions, that is, the inserting portions with respect to the penetrating portions will be made still larger, thus enabling the mounting strength of the ornament to be further increased.

Still further, by constructing the air bag cover in such a manner that on the back face of the door section, there are formed the projections so as to surround the bent portions of the mounting legs which have been bent along the back face of the door section, and the projections are provided with intended melting and solidifying parts capable of covering the tip ends of the bent portions when melted, thereby to form the covering parts, the bent portions can be easily set in position by engaging in areas surrounded by the projections, when the ornament is mounted. At the same time, the tip ends of the bent portions can be easily covered by melting and solidifying the intended melting and solidifying parts which have been arranged beforehand around the bent portions. In addition, there is no need of preparing material for the covering parts separately, and thus, covering workability will be enhanced.

DETAILED DESCRIPTION OF THE PREFERRED EMBODIMENTS

Figure 1:
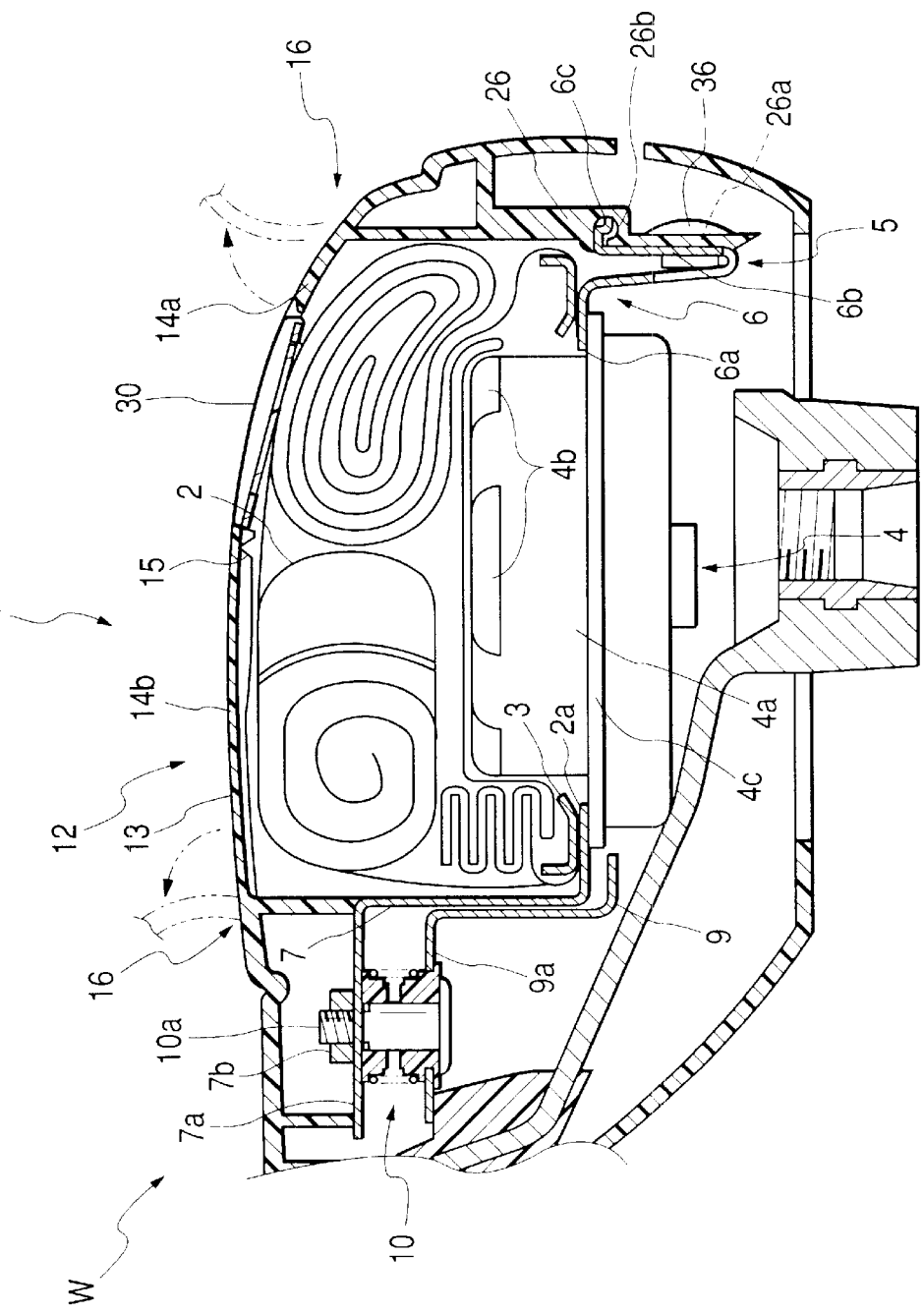
FIG. 1 is a sectional view showing an air bag cover with ornament according to the present invention in use, which corresponds to a view taken along a line I—I of FIG. 2.

Now, embodiments according to the invention will be described referring to the drawings.

Figure 2:
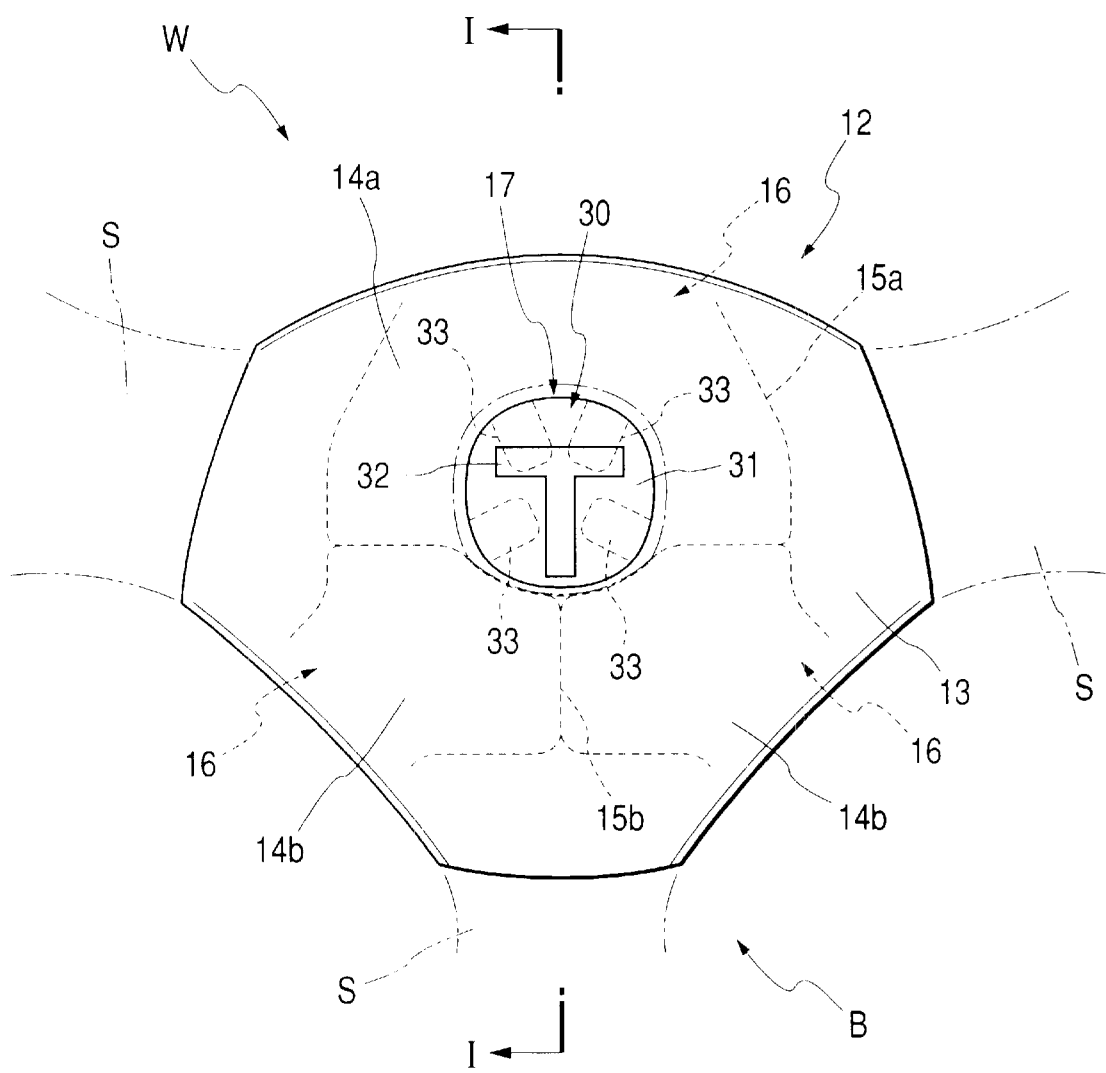
FIG. 2 is a plan view of the air bag cover provided with the ornament according to the present invention.

An air bag cover 12 provided with an ornament 30 in the embodiment is employed in an air bag system 1 which is disposed in an upper part of a center boss B of a steering wheel W of a type having three spokes as shown in FIGS. 1 and 2. The air bag system 1 is composed of an air bag 2 which is folded to be contained, an inflator 4 for supplying an inflation gas to the air bag 2, a bag holder 5 for holding the air bag 2, the inflator 4 and the air bag cover 12, and a support plate 9. The air bag system 1 is constructed in such a manner that the air bag system 1 is supported by the support plate 9, and a horn switch mechanism 10 is interposed between the air bag system 1 and the support plate 9.

The air bag 2 is in a form of a bag having an opening 2a in the bottom. The inflator 4 consists of a cylindrical inflator body 4a provided with gas outlets 4b in its upper part, and a flange portion 4c projecting from an outer peripheral face of the inflator body 4a.

The bag holder 5 includes a bottom wall 6 having at its center an insertion bore 6a into which the inflator body 4a is inserted from below, and side walls 7 extending upward from an outer circumferential edge of the bottom wall 6. The side walls 7 are respectively formed at three positions near places where the spokes S (See FIG. 2) are arranged. A front edge of the bottom wall 6 is provided with connecting portions 6b which are extended downward and folded back upward, and locking claws 6c which are folded back downward are formed at tip ends of the connecting portions 6b. These connecting portions 6b are respectively formed at positions of the steering wheel W where the spokes S are not provided, in other words, three positions namely, a front side of the steering wheel, and backward left and right sides thereof. Each of the connecting portions 6b engages with a locking groove 26b formed in a side wall 26 of the air bag cover 12 by means of the locking claw 6c, and at the same time, the side wall 26 is fixed by a rivet 36 thereby mounting the air bag cover 12 to the bag holder 5.

Each of the side walls 7 of the bag holder 5 extends upward from the bottom wall 6, and has an outwardly extending mounting portion 7a at its upper end. The mounting portion 7a is fixed by a nut 7b so as to be connected to and supported by a support portion 9a of the support plate 9 with the horn switch mechanism 10 which is interposed therebetween by means of a stepped bolt 10a of the horn switch mechanism 10 screw mounted by the nut 7b.

An annular retainer 3 which is arranged at a circumferential edge of the opening 2a of the air bag 2 is provided with bolts (not shown). Mounting of the air bag 2 and the inflator 4 to the bag holder 5 is conducted by penetrating these bolts through the circumferential edge of the opening 2a, a circumferential edge of the insertion bore 6a of the bottom wall 6 of the bag holder 5, and the flange portion 4c of the inflator 4, and by fixing the bolts with nuts.

The air bag cover 12 is formed of thermoplastic elastomer such as polyolefin, styrene, or the like, and consists of a ceiling wall 13 covering an upper part of the folded air bag 2 and the side walls 26 substantially in a shape of a triangular prism projecting downward from a lower face of the ceiling wall 13.

At predetermined positions of the side walls 26, there are formed a plurality of mounting holes 26a by means of which the cover 12 is fixed to the connecting portions 6b of the bag holder 5 with the rivets 36.

As shown in FIG. 2, the ceiling wall 13 includes a large door section 14a arranged in a forward area with respect to a longitudinal direction of the vehicle and two small door sections 14b, 14b arranged on left and right sides in a backward area with respect to the direction of the vehicle. Near a backward center of the large door section 14a, there is disposed an ornament 30 in a substantially round shape.

An area where an ornamental part 31 of the ornament 30 is arranged makes an arrangement area 17. Thin walled tear-off portions 15 intended to be broken are formed around the door portion 14 (14a, 14b) in a manner of encircling the ornament 30 and the arrangement area 17. As shown in FIG. 2, these intended tear-off portions 15 include a substantially U-shaped portion 15a and a substantially inverted T-shaped portion 15b which are connected in a longitudinal direction of the vehicle as seen from the above. The large door section 14a is so designed as to be opened forward when the U-shaped portion 15a is broken, while the small door sections 14b, 14b are so designed as to be opened diagonally backward to the left and to the right when both the U-shaped portion 15a and the inverted T-shaped portion 15b are broken. Hinge portions 16 at which the door sections 14a and 14b is opened are located near the side walls 26.

Figure 5:
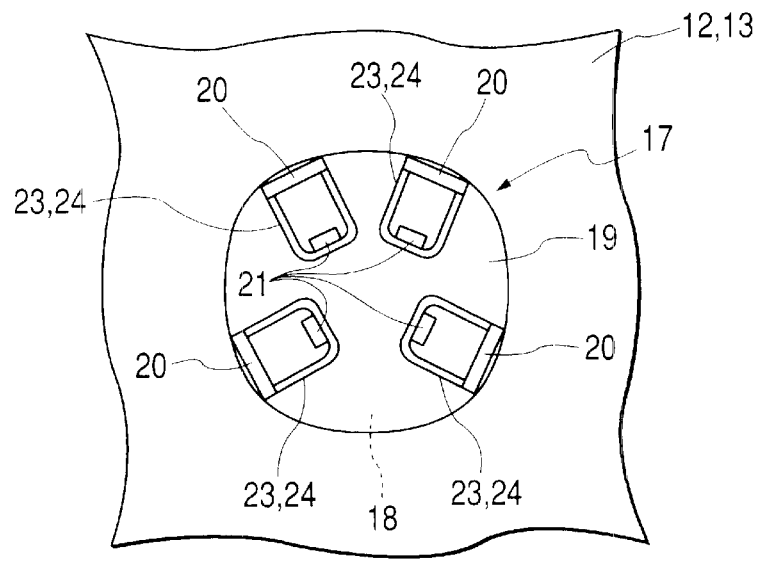
FIG. 5 is a bottom view showing an essential part of the air bag cover to be used in the fist embodiment.
Figure 6:
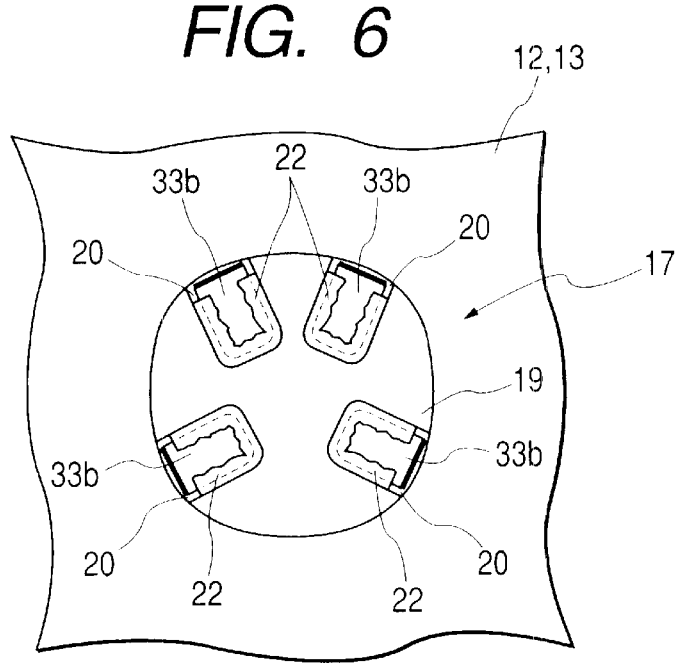
FIG. 6 is a bottom view showing the essential part of the air bag cover provided with the ornament according to the first embodiment.
Figure 7:
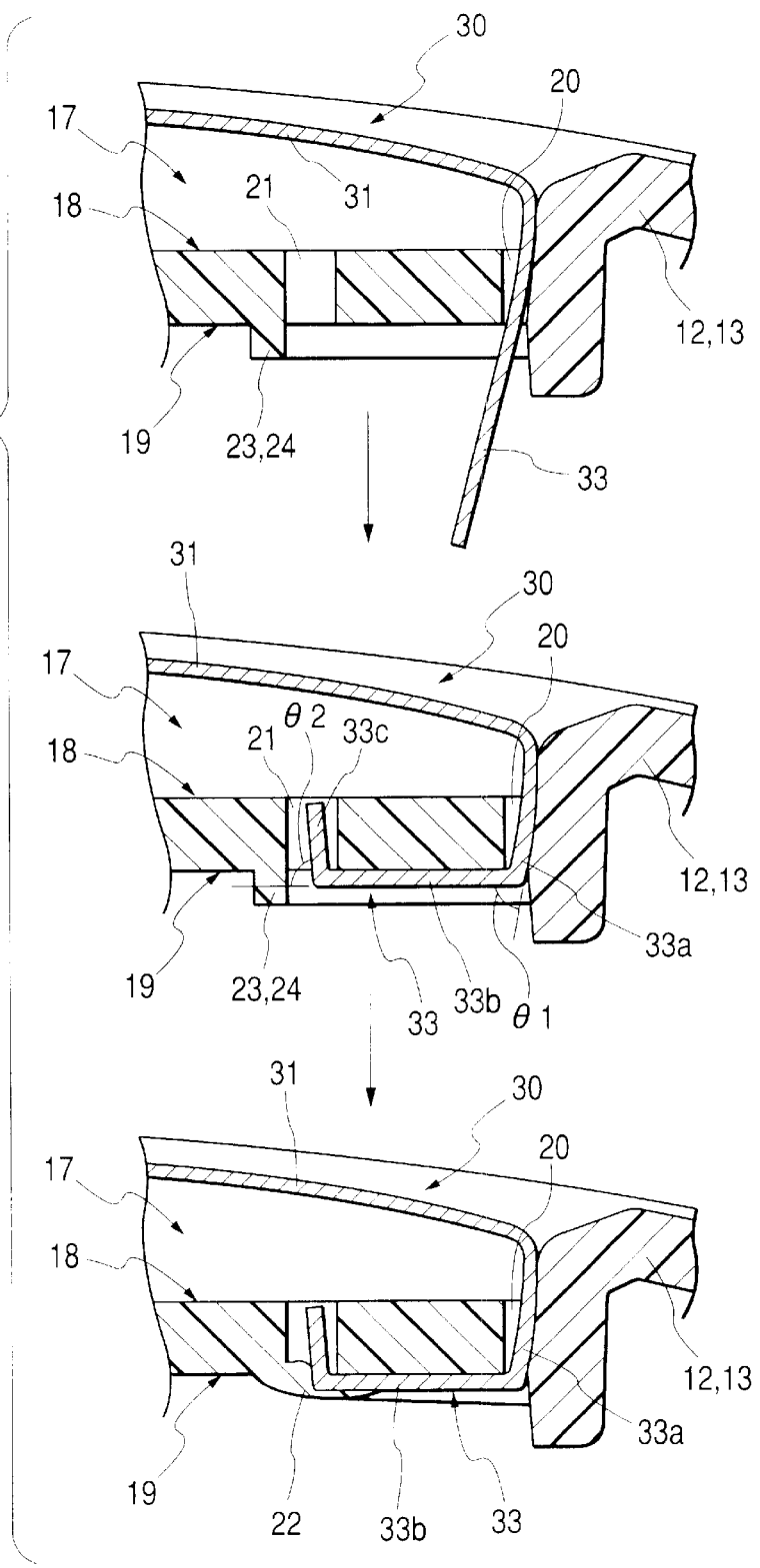
FIG. 7 is a schematic sectional view of the essential part sequentially showing mounting processes of the ornament according to the second embodiment to the air bag cover.

The arrangement area 17 is constituted by positioning mount recesses 18, 19 which are dented in a substantially round shape from a front face and a back face of the ornament 30. As shown in FIGS. 5, 6, the arrangement area 17 has mounting holes 20 through which four mounting legs 33 of the ornament 30 which will be described below are adapted to pass across the front and the back face respectively, at four positions near edges of the mount recesses 18, 19. Each of the mounting holes 20 is formed in a substantially rectangular shape. Further, insertion holes 21 into which tip ends of the four mounting legs 33 are adapted to be inserted are formed so as to pass across the front and the back faces, at positions near a center of the arrangement area 17 where bent portions 33b of the mounting legs 33 which will be described below are located. Each of the insertion holes 21 is also formed in a substantially rectangular shape. FIG. 5 shows the arrangement area 17 before the ornament 30 is mounted, and the mount recess 19 is provided with projections 23. Each of the projections 23 is formed in a substantially U-shape as seen from the below so as to surround the bent portion 33b, when a penetrating portion 33a of the mounting leg 33 is passed through the mounting hole 20 and the bent portion 33b of the mounting leg 33 is bent and disposed. The projections 23 are provided for the purpose of forming covering parts 22 which will be described below, when the ornament 30 is mounted. A projected amount of the projection 23 is made larger than a thickness of the mounting leg 33 (the bent portion 33b) as shown in FIG. 7. A lower end of the projection 23 will be made as a melting and solidifying part 24.

Figure 3:
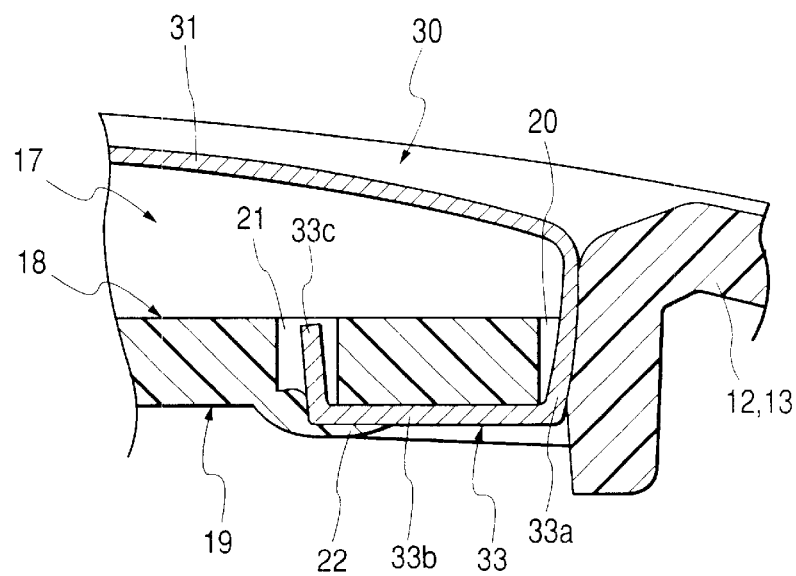
FIG. 3 is a sectional view showing an essential part of the air bag cover provided with the ornament according to the first embodiment.
Figure 4:
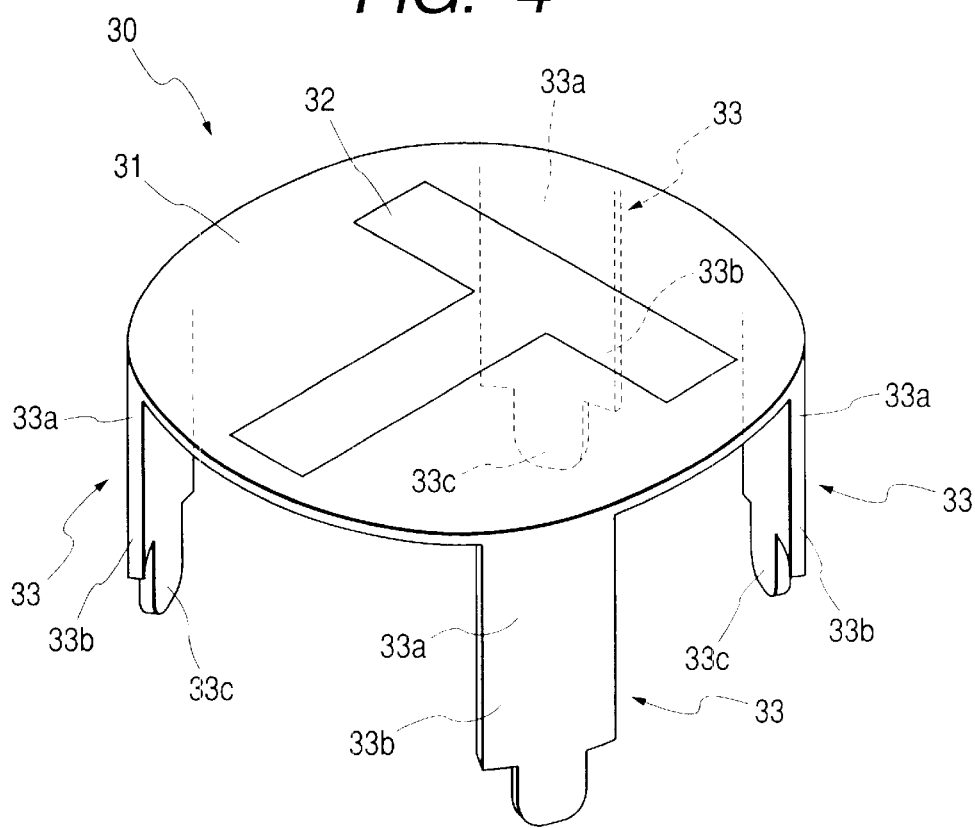
FIG. 4 is a perspective view of the ornament to be used in the first embodiment.

The ornament 30 is composed of the ornamental part 31 in a substantially round shape to be arranged on a surface of the arrangement area 17, and the four mounting legs 33 extending downward from the outer circumferential edge of the ornamental part 31 and adapted to fix the ornamental part 31 to the arrangement area 17 for the door section 14a, by inserting the legs through the mounting holes 20 and bending the mounting legs 33 along a back face of the door portion 14. The ornamental part 31 has a decorative body part 32 indicating letters or patterns as seen in a plan view. As shown in FIGS. 3, 4, each of the mounting legs 33 has the penetrating portion 33a passing through the mounting hole 20, the bent portion 33b which is bent along the back face of the door section 14a (the mount recess 19) toward the center, and the inserting portion 33c which is bent upward from a tip end of the bent portion 33b to be inserted into the insertion hole 21. In FIG. 4, there is shown the ornament 30 before it is attached to the air bag cover 12. In this state, all the penetrating portion 33a, the bent portion 33b and the inserting portion 33c of each of the mounting legs 33 of the ornament 30 are rectilinearly formed, and will be respectively bent when the ornament 30 is attached. It is to be noted that the inserting portion 33c is made narrower than the penetrating portion 33a and the bent portion 33b as shown in FIG. 4. As shown in FIGS. 3, 6, the tip end part of the bent portion 33b is covered with the covering part 22. This covering part 22 is formed by melting and solidifying the melting and solidifying part 24 provided at the lower end of the projection 23.

This ornament 30 is formed of a sheet of metal material such as aluminum, stainless steel or the like (an aluminum plate having a thickness of about 0.5 mm in the embodiment) by a press work such as stamping or embossing.

Now, assembling of the ornament 30 to the air bag cover 12 will be described. As shown in an upper part of FIG. 7, the mounting legs 33 are passed through the mounting holes 20 until the ornamental part 31 is engaged in the mount recess 18. Then, as shown in a middle part of FIG. 7, the bent portions 33b are bent toward the center, and further, the inserting portions 33c are bent upward to be inserted into the insertion holes 21. Finally, as shown in a lower part of FIG. 7, the melting and solidifying parts 24 formed at the lower ends of the projections 23 are melted by heating and vibrating, and then solidified by cooling, thus forming the covering parts 22 which cover areas around the insertion holes 21 and the tip ends of the bent portions 33b. In this manner, the assembling and fixture of the ornament 30 to the air bag cover 12 will be completed.

Further, assembling of the air bag system 1 will be described. The air bag 2 is folded with the retainer 3 disposed inside the air bag 2, and the inflator body 4a is inserted into the insertion bore 6a from the below. Then, the non shown bolts of the retainer 3 are passed through the bottom wall 6 of the bag holder 5 and the flange portion 4c of the inflator 4 and retained by the nuts. Thereafter, the air bag cover 12 having the ornament 30 fixed thereto is placed on the folded air bag 2, and the side walls 26 are fixed to the connecting portions 6b of the bag holder 5 by means of the rivets 36 while inserting the locking claws 6c into the locking grooves 26b. Then, the support portion 9a of the support plate 9 is connected to the mounting portion 7a of each of the side walls 7 of the bag holder 5 by screwing the stepped bolt 10a into the nut 7b interposing the horn switch mechanism 10 therebetween, thus completing the assembling of the air bag system 1. This air bag system 1 may be disposed in the steering wheel W.

After the steering wheel W has been mounted on the vehicle, when a gas is discharged from the gas outlets 4b of the inflator 4, the air bag 2 will be inflated to push the intended tear-off portions 15 allowing them to be expanded and broken, and the door portion 14 (14a, 14b) will be opened. Thus, the air bag 2 will be allowed to project from the ceiling wall 13 of the cover and extensively expand.

In the air bag cover 12 provided with the ornament 30 according to this embodiment, the tip ends of the mounting legs 33 are not exposed on the back face of the door section 14a when the door portion 14 (14a, 14b) is opened, because the tip end parts of the bent portions 33b of the mounting legs 33 of the ornament 30 are covered with the covering parts 22 which have been formed by melting and solidifying the melting and solidifying parts 24 formed in the mount recess 19 in the air bag cover 12. Accordingly, the expanding and inflating air bag 2 will not interfere with the corners of the tip ends of the mounting legs 33 of the ornament, and the air bag 2 will not be damaged by the ornament 30.

According to the described embodiment, the mount recess 19 is provided with the insertion holes 21 so as to pass across the front and the back faces, and the ornament 30 has the inserting portions 33c which can be inserted into the insertion holes 21, at the tip ends of the bent portions 33b of the mounting legs 33 respectively. The ornament 30 is mounted to the door section 14a in a state where the inserting portions 33c have been inserted into the insertion holes 21. In such a state, provided that a bending angle of the bent portion 33b with respect to the penetrating portion 33a is θ1, and a bending angle of the inserting portion 33c with respect to the bent portion 33b is θ2 as shown in the middle part of FIG. 7, a bending angle of the tip end of the mounting leg 33, that is, the inserting portion 33c with respect to the penetrating portion 33a will be θ1+θ2. Accordingly, the inserting portion 33c is bent at more than 90 degrees with respect to the penetrating portion 33a. Moreover, because the ornament 30 is mounted to the door section 14a while the tip ends of the bent portions 33b are covered with the covering parts 22, a spring up of the tip ends of the mounting legs 33 (the bent portions 33b) away from the back face of the door section 14a can be prevented by the covering parts 22. For this reasons, the mounting legs 33 of the ornament 30 will not be detached from the mounting holes 20, when the door section 14a of the air bag cover 12 is opened in accordance with the expansion and inflation of the air bag 2, and mounting strength of the ornament 30 can be fully secured.

Although the insertion holes 21 are formed so as to pass across the front and the back faces in this embodiment, they may be formed as a concave extending toward the front face of the door section 14a.

Figure 8:
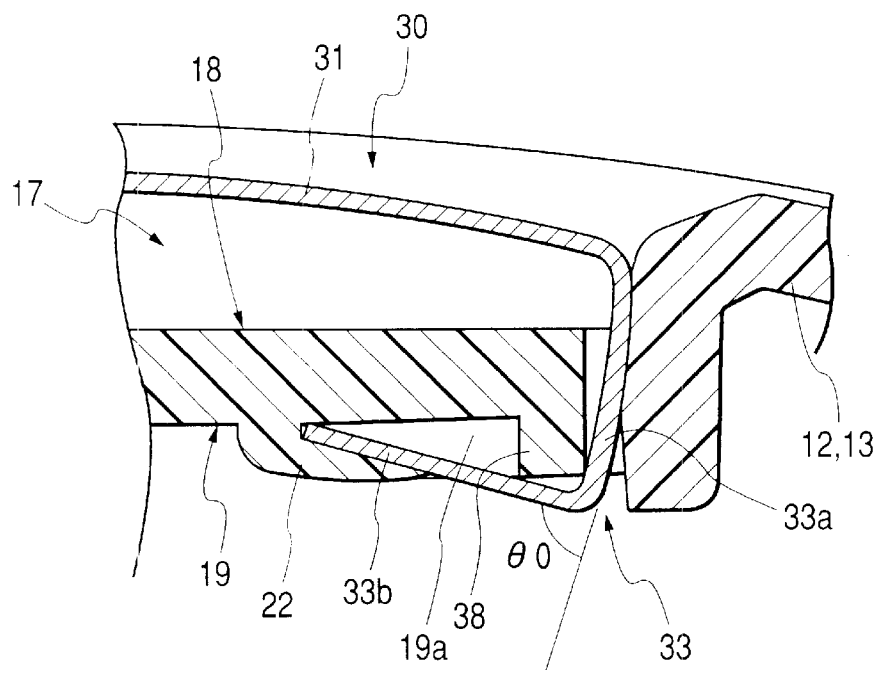
FIG. 8 is a sectional view showing an essential part of an air bag cover with ornament according to another embodiment of the invention.

Also, in the embodiment, the mounting leg 33 is so constructed as to include the inserting portion 33c at the tip end of the bent portion 33b. However, the invention is not limited to such a structure, but the mounting leg 33 may have only the penetrating portion 33a and the bent portion 33b without the inserting portion 33c, and the tip end of the bent portion 33b may be covered with the covering part 22, as shown in FIG. 8. In this case, a downwardly projecting portion 38 may be preferably provided near the mounting hole 20 in the mount recess 19, and the bent portion 33b may be bent at the bending angle θ0 more than 90 degrees with respect to the penetrating portion 33a. This is because the mounting strength can be increased in case where the bending angle θ0 of the bent portion 33b with respect to the penetrating portion 33a is larger than 90 degrees.

Further, in this embodiment, free spaces 19a are formed between the bent portions 33b and the bottom surface of the mount recess. Hence heat transfer to the back face of the air bag cover 12 and undesirable deformation and damage of the ornament 30 is prevented.

Figure 9:
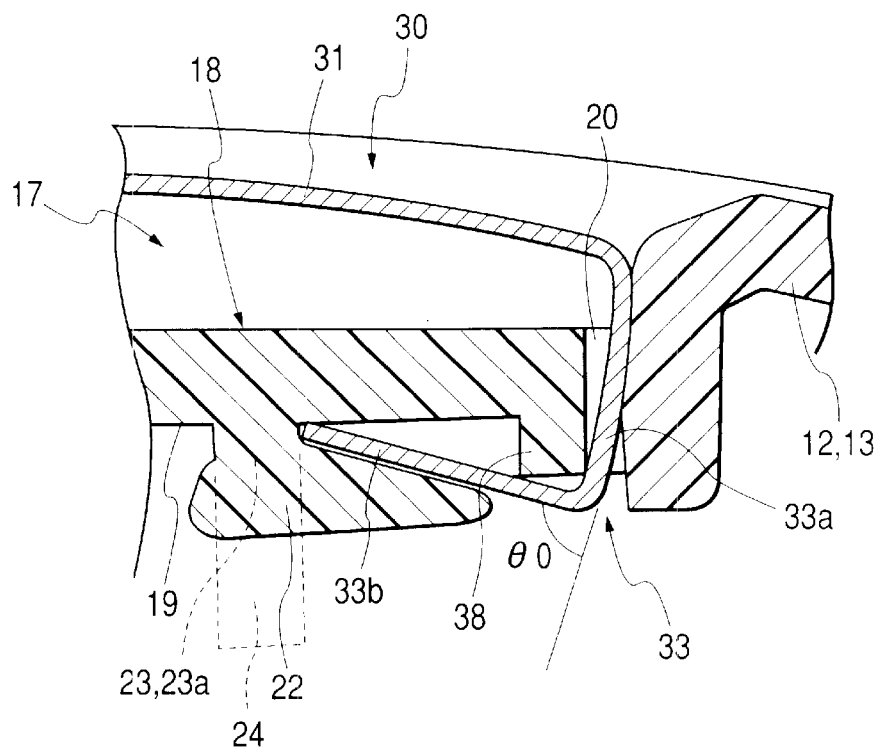
FIG. 9 is a sectional view showing an essential part of the air bag cover provided with the ornament according to third embodiment of the present invention.
Figure 10:
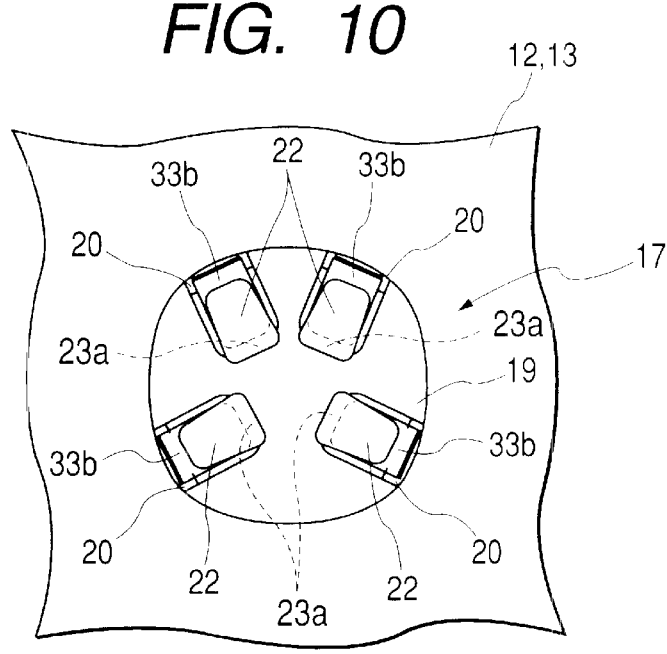
FIG. 10 is a plan view of the air bag cover provided with the ornament according to the third embodiment of the invention.

Although, in the above embodiments, the melting and solidifying parts 24 provided with the whole lower portions of the projections 23 formed in a substantially U-shape so that the whole areas around the tip ends of the bent portions 33b are covered, the melting and solidifying parts 24 can be formed only on base side portions 23a of the U-shaped projections 23. In this case, as shown in FIGS. 9 and 10, the melting and solidifying parts 24 are melted outward in radial directions so as to cover the bent portions 33b entirely in width of the mounting legs 33, and then solidified so as to form the cover portions 22. Incidentally, it is preferable that the base side portions 23a of the projections 23 are formed thicker than the other portions of the projections 23, so that the melting and solidifying parts 24 formed on the base side portion 23a are provided with a sufficient volume for covering the predetermined areas after solidification.

By such the arrangement, the outer surfaces of the mounting legs 33 are not exposed and the tip ends of the mounting legs 33b are completely covered by the covering parts 22. Therefore, the mounting strength of the ornament 30 can be increased without forming the inserting portion 33c in the mounting leg 33, and a spring up of the tip ends of the mounting legs 33 (the bent portions 33b) away from the back face of the door section 14a can be prevented more reliably.

Figure 11:
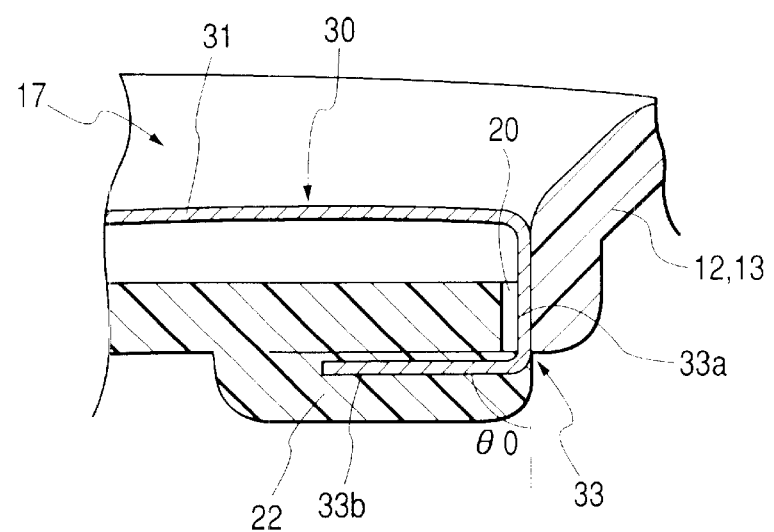
FIG. 11 is a sectional view showing an essential part of the air bag cover provided with the ornament according to the fourth embodiment of the present invention.
Figure 12:
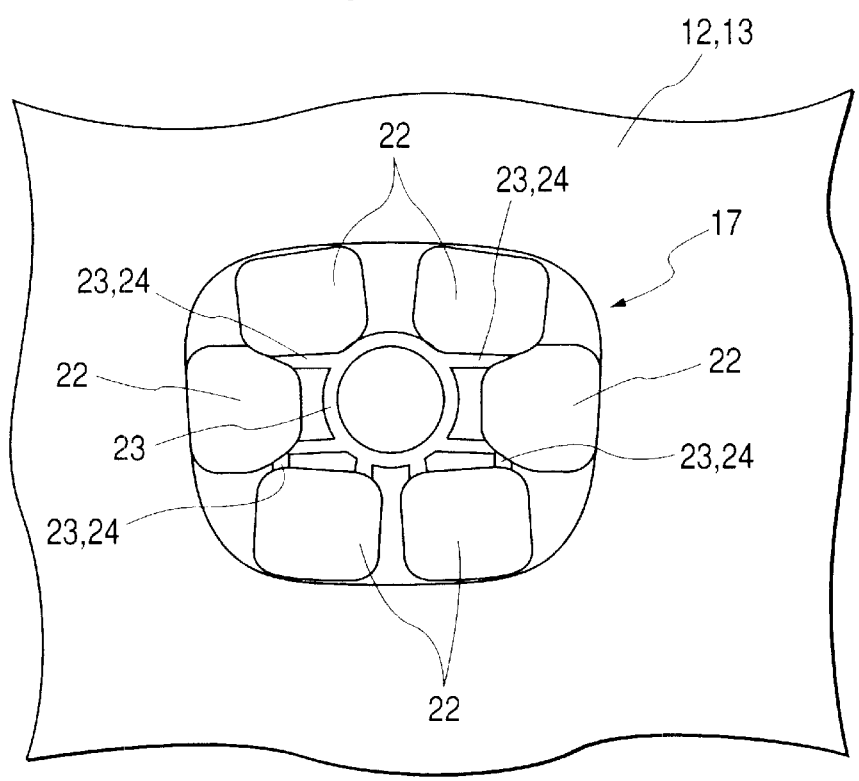
FIG. 12 is a plan view of the air bag cover provided with the ornament according to the fourth embodiment of the invention.

Further, although the mounting legs 33 are provided at four parts in the above embodiments, it is possible to provide another number of the mounting legs 33. An embodiment in which the mounting legs 33 are provided at 6 parts is shown in FIGS. 11 and 12. In a case where the larger number of the mounting legs 33 are provided, since a generated load is distributed to each mounting leg 33, fastening strength at each mounting leg 33 can be lowered. As a result, the mounting legs 33 can be provided smaller in dimensions.

The mounting legs 33 are provided smaller, it becomes easier to completely cover the outer surfaces of the mounting legs 33 with the covering parts 22 by forming the projections 23 and the melt and solidifying parts 24 around the mounting legs 33 to be covered. In such a structure where the outer surfaces of the mounting legs 33 are completely covered, a sufficient mounting strength is obtained and a fear that the air bag may be damaged by corners at the tip ends of the leg portions is further reduced.

Further, in the above embodiments, the melting and solidifying parts 24 are formed beforehand at the projections 23 which project downward from the mount recess 19. As the result, the bent portions 33b can be easily set in position by engaging in the areas surrounded by the projections 23, when the ornament 30 is mounted. At the same time, the tip ends of the bent portions 33b can be easily covered by melting and solidifying the intended melting and solidifying parts 24 which have been arranged beforehand around the bent portions 33b. In addition, there is no need of preparing material for the covering part 22 separately, and thus, covering workability will be enhanced. It is obvious that the projections 23 (the intended melting and solidifying parts 24) need not be integrally formed with the air bag cover 12, but after the ornament 30 has been assembled, separate material which is compatible with the material forming the air bag cover 12 may be fixed to the air bag cover 12 by welding or so, so as to form the covering parts 22 around the tip ends of the bent portions 33b.

Although the embodiments have been described referring to the ornament 30 to be mounted to the air bag cover 12 for the steering wheel W, the invention can be applied to the ornaments when they are attached to the air bag covers of the air bag systems to be mounted in front of the assistant driver's seat, the doors, the seats, the interior walls and so on of the vehicle.

Further, in the embodiments, the ornamental part 31 having a substantially round shape and the four mounting legs 33 is employed as the ornament 30. However, the shape of the ornament and the number of the mounting legs are not restricted to this embodiment, but the ornament having an oval shape and two or three mounting legs may be used. Moreover, although the mounting legs 33 are bent toward the center in this embodiment, the mounting legs 33 may be bent radially outwardly.

What is claimed is:

1. An air bag cover for covering a folded air bag, comprising:
   a door portion adapted to open when said air bag is expanded and inflated and having at least one mounting hole thereon; and
   an ornament having an ornamental part arranged on a front face of said door portion and at least one mounting leg extending downward from said ornamental part, said at least one mounting leg comprising a penetrating portion which passes through said at least one mounting hole and a bent portion being bent along the back face of said door portion, wherein said ornament is mounted to said door portion by passing said at least one mounting leg through said at least one mounting hole and bending said at least one mounting leg along a back face of said door portion, and at least a tip end of said bent portion of said at least one mounting leg is covered with a covering part.

2. An air bag cover according to claim 1, wherein said bent portion of said at least one mounting leg is bent at a bending angle of 90 degrees or more with respect to said penetrating portion of sad at least one mounting leg.

3. An air bag cover according to claim 1, wherein said door portion further comprises at least one inserting hole on the back face of said door portion near the tip end of said bent portion of said at least one mounting leg, said insertion hole extending toward the front face of said door portion, and said at least one mounting leg further comprises an inserting portion at the tip end of said bent portion of said at least one mounting leg, whereby said ornament is mounted to said door portion with said inserting portion inserted in said insertion hole.

4. An air bag cover according to claim 1, wherein said door portion further comprises at least one projection formed on the back face of said door portion so as to surround said bent portion of said at least one mounting leg, and said at least one projection is melted and solidified to thereby form said covering part.

5. An air bag cover according to claim 4, wherein the at least one projection is U-shaped.

6. An air bag cover according to claim 4, wherein a projected amount of the at least one projection is larger than a thickness of the bent portion.

7. An air bag cover according to claim 1, wherein the covering part is U-shaped.

8. An air bag cover according to claim 1, wherein the covering part covers the bent portion entirely.

\* \* \* \* \*